March 10, 1970   R. R. JONES ET AL   3,500,460
MICROWAVE POLARIZATION SWITCH
Filed May 17, 1967   6 Sheets-Sheet 1
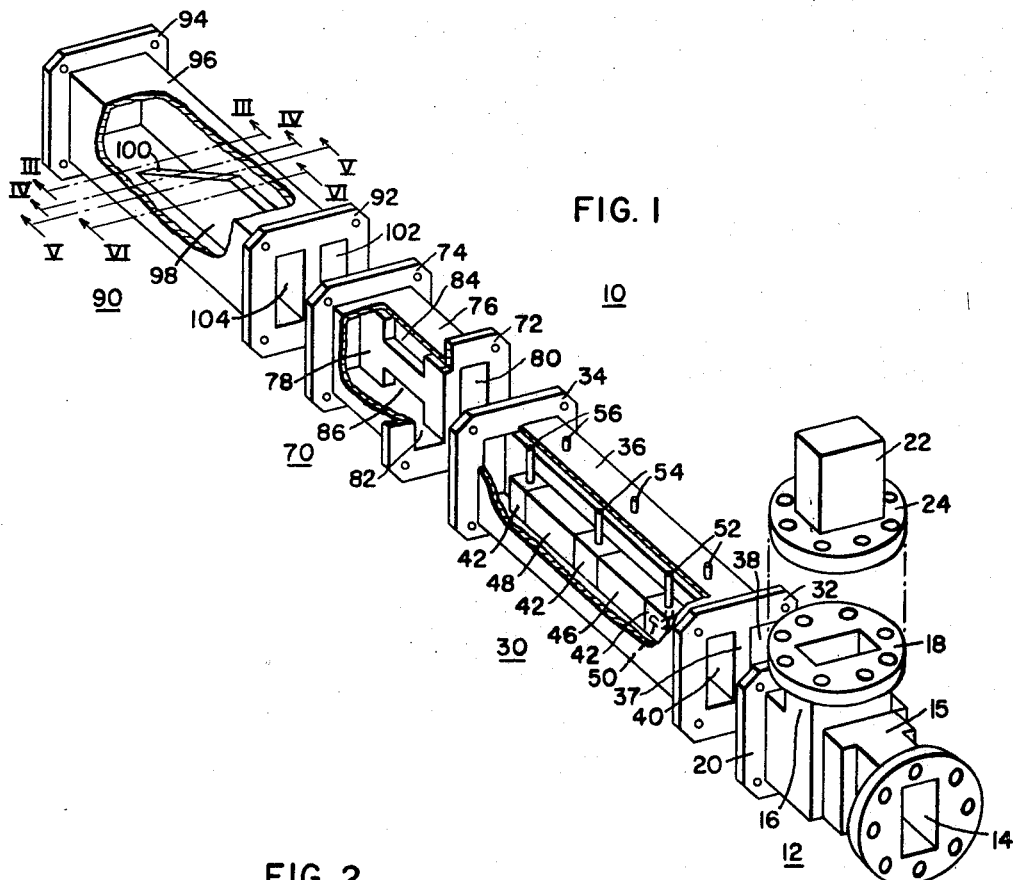
FIG. 1
FIG. 2
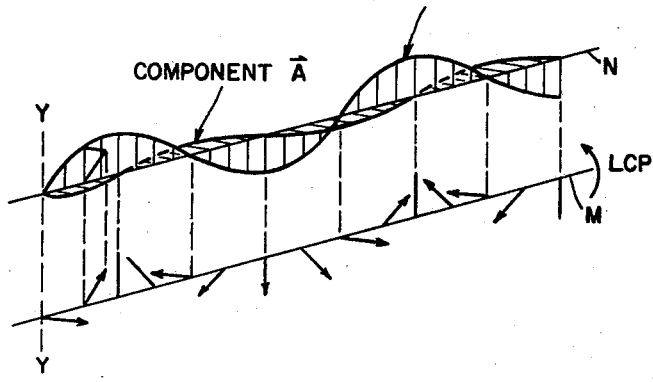
WITNESSES
Wm. B. Sellers
James F. Young
INVENTORS
Raymond R. Jones and
Joseph A. Kempic
BY R. Lewis Gable
ATTORNEY

TRANSMIT

RECEIVE

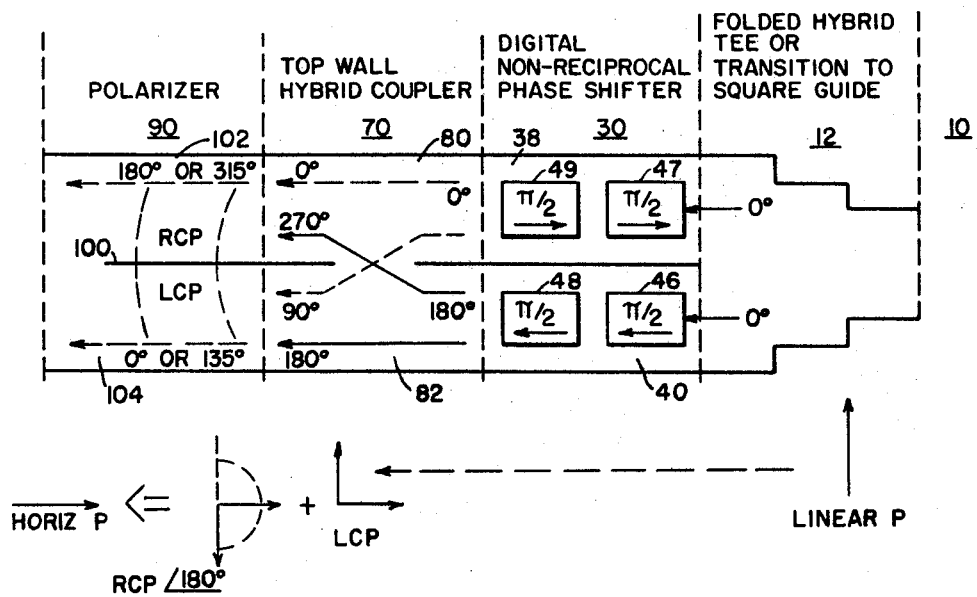
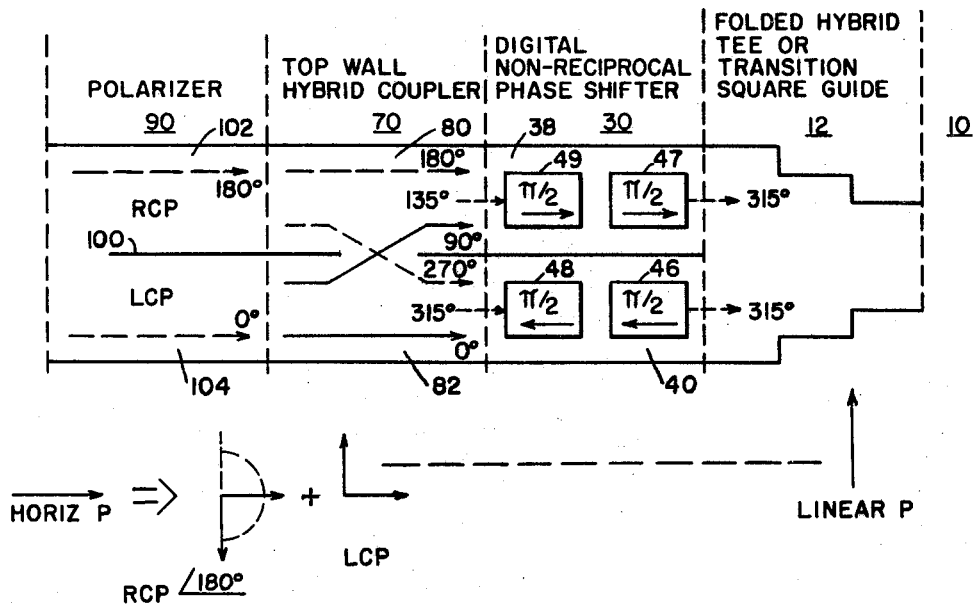

United States Patent Office 3,500,460
Patented Mar. 10, 1970

3,500,460
MICROWAVE POLARIZATION SWITCH
Raymond R. Jones, San Jose, Calif., and Joseph A. Kempic, Ellicott City, Md., assignors to Westinghouse Electric Corporation, Pittsburgh, Pa., a corporation of Pennsylvania
Filed May 17, 1967, Ser. No. 639,112
Int. Cl. H01p 3/16
U.S. Cl. 333—21                                    8 Claims

ABSTRACT OF THE DISCLOSURE

This invention relates to a microwave polarization switching system illustratively including a magic tee for dividing the input microwave energy into two linearly microwave signals, a phase shifter having two channels disposed to receive the two microwave signals and including a plurality of ferrite bits for shifting the phase of the microwave signals, and a tapered fin polarizer for converting the linearly polarized microwave signals into circularly polarized microwave signals.

---

This invention relates to microwave polarization switches and more particularly to such devices (or systems of such devices) which are capable of effecting non-reciprocal characteristics in transmit and receive conditions.

In many microwave systems, it is necessary to manipulate or switch the polarization of microwave energy. Typically, it is desired to convert a microwave signal of linear polarization propagating in a rectangular wave guide into either right circular, left circular, vertical linear, or horizontal linear polarization propagating in a square or round wave guide. Present microwave phase shifters are capable of changing the plane of polarization in time periods of the order of milliseconds and are typically quite large due to their bulky magnetic control circuitry.

Further, it is desired that the microwave polarization switch be non-reciprocal so that it can be adapted to be used in a radar system where it is necessary to transmit one sense of circular polarization and to receive the opposite sense of circular polarization. The microwave energy radiated from the antenna of the radar system strikes the target and an echo of the radiated microwave energy is returned to the antenna of the radar system. The return echo is of a reverse polarity from the orientation of the transmitted microwave energy. Therefore, if a reciprocal device is used in conjunction with a common antenna for transmitting and receiving, either a dual polarization antenna or feed system will be required.

It is therefore an object of this invention to provide a new and improved microwave polarization switch which is capable of effecting the polarization of microwave signals at sub-microsecond speeds.

It is a further object of this invention to provide a new and improved microwave polarization switch which is small in size and which requires minimal energy to effect a phase shift.

These and other objects are accomplished in accordance with the teachings of this invention by providing a microwave polarization switch including a device such as a folded T for dividing the input microwave energy into two microwave signals, a phase shifter divided into the two channels each including a number of microwave ferrite segments or bits for shifting the phase of the microwave signals a predetermined angle in response to an input current pulse applied to the ferrite bits, and a microwave device disposed to receive the microwave signals for converting the linearly polarized microwave signals into circularly polarized microwave signals. Illustratively, the last-mentioned microwave device may include a wave guide in which there is disposed a tapered fin or partition providing two channels into which the linearly phased microwave signals are introduced.

Further, there may be inserted between the phase shifter and the tapered fin polarizer a microwave device such as a hybrid coupler for transferring specific amount of energy between the output ports of the coupler. Further, the phase shifter may include a plurality of ferrite, phase shifter bits capable of shifting the phase of the microwave signal in incremental steps which as a system would be capable of shifting the plane of polarization of the microwave energy from —90° to +90°.

These and other objects and advantages of the present invention will become more apparent in view of the following detailed description and drawings, in which:

FIGURE 1 is an isometric view, partially broken away, of a microwave polarization switching system in accordance with the teachings of this invention;

FIG. 2 is a graphic representation of the vector relations of a left circularly polarized microwave which may be applied to the polarization switching system of FIG. 1;

Figure 5:
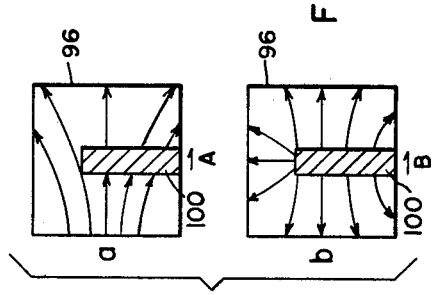
Figure 4:
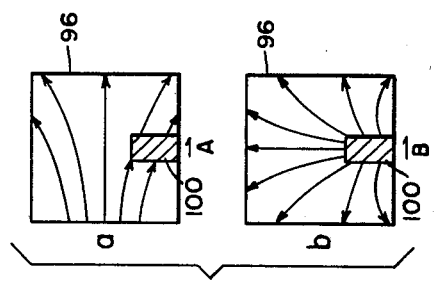
Figure 3:
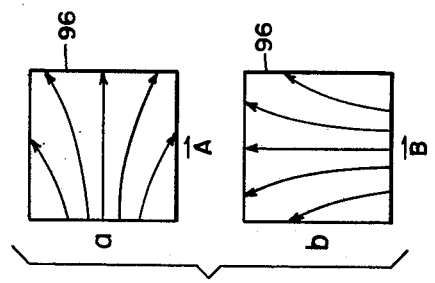
Figure 12:
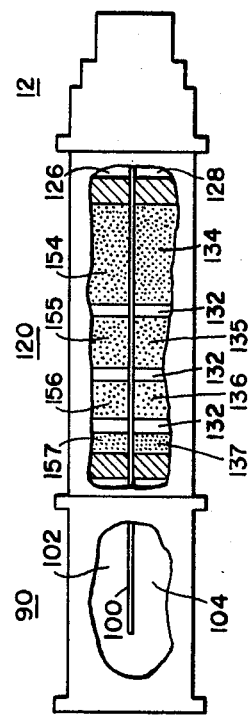
Figure 11:
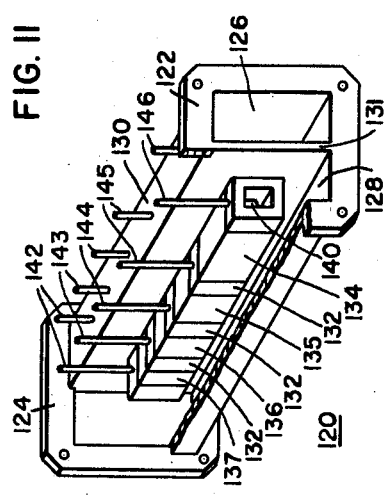
Figure 7A:
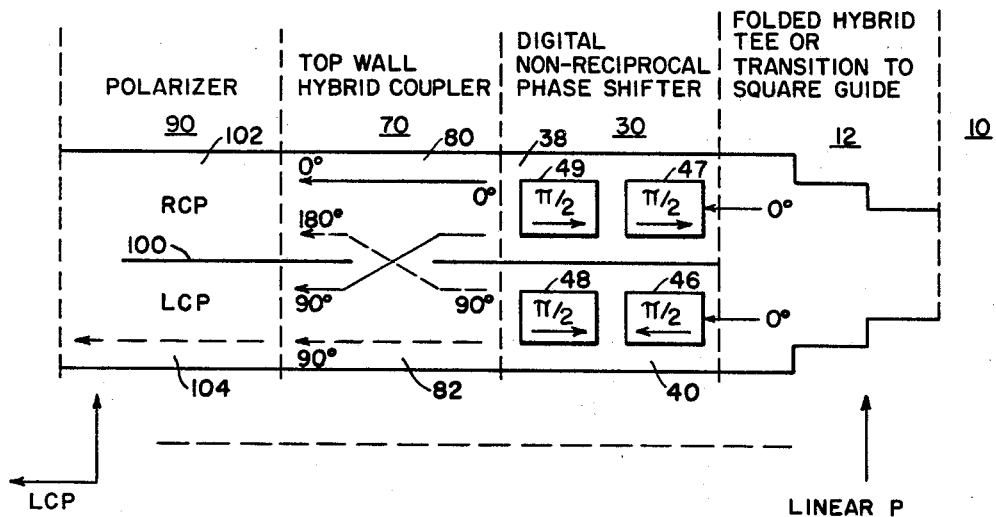
Figure 7B:
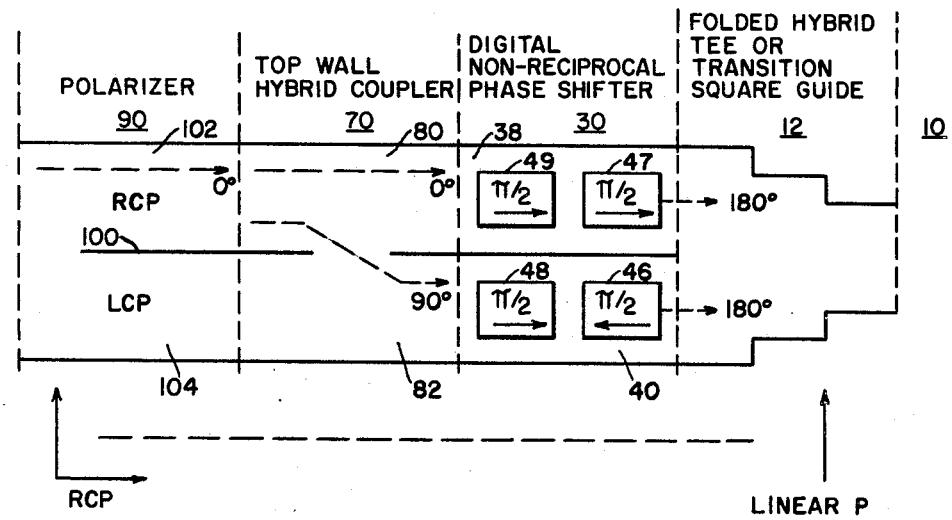
Figure 8A:
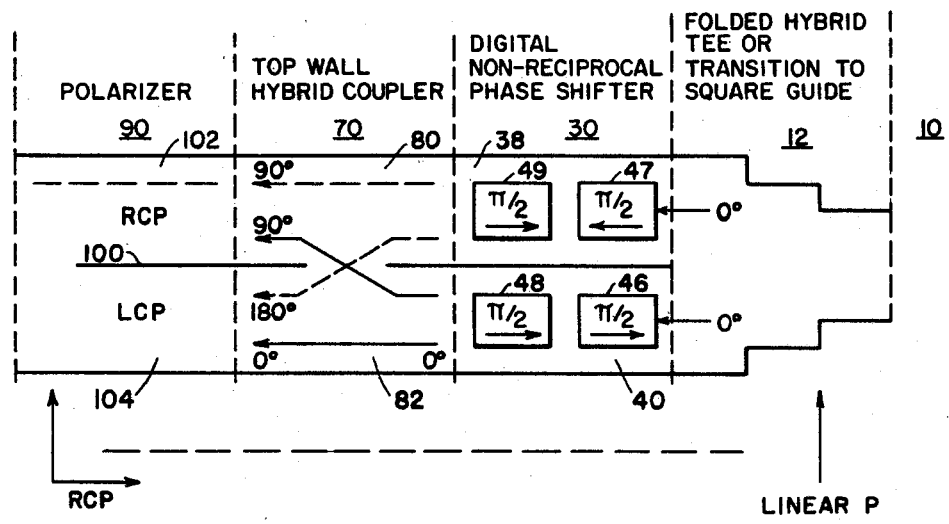
Figure 8B:
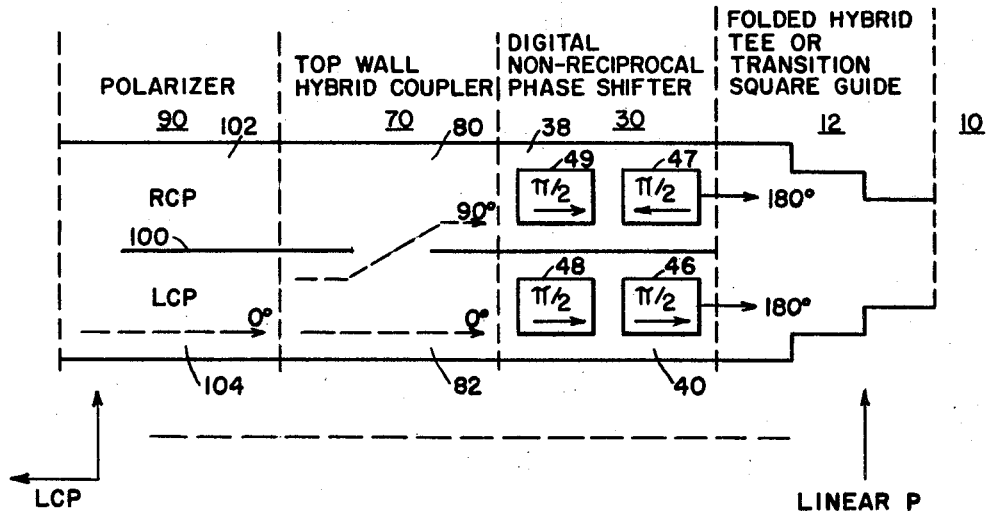

FIGS. 3a and 3b; FIGS. 4a and 4b; FIGS. 5a and 5b; and FIGS. 6a, 6b and 6c are cross sectional views taken along lines III—III, IV—IV, V—V and VI—VI respectively of the tapered fin polarizer shown in FIG. 1 to demonstrate the progressive field configurations of the microwave signals directed therethrough;

FIGS. 7a and 7b; FIGS. 8a and 8b; FIGS. 9a and 9b and FIGS. 10a and 10b are diagrammatic representations of the system of FIG. 1 showing the various modes of operation that this system is capable of;

FIG. 11 is an isometric view of a phase shifter including a plurality of incremental phase shifting bits or segments; and FIG. 12 is a diagrammatic view of a microwave polarization switching system in which the digital phase shifter of FIG. 11 may be incorporated.

Referring now to the drawings and in particular to FIG. 1, there is shown a polarization switching system 10 including an E plane, folded hybrid tee 12 for separating the microwave energy applied thereto into two microwave signals whirh are applied to a phase shifter 30 having two sets of non-reciprocal, latching, ferrite phase shifters disposed respedtively to receive the microwave energy, a hybrid coupler 70 to effect an interchange of microwave energy between the two channels thereof and a tapered fin polarizer 90. The aforementioned are longitudinally disposed of each other and are secured together as shown in FIG. 1 to sequentially operate on the microwave energy which may be introduced at either end of the system 10. As will be explained in greater detail later, the polarization switching system 10 is non-reciprocal and operates differently upon the microwave energy that is introduced at either end of the system.

More specifically, a linearly polarized microwave signal is introduced into a rectangular input opening 14 of the magic tee 12. Further, the microwave energy travels through an E arm 15 to be divided into two microwave signals. The magic tee 12 further includes an H arm 16 upon which there is disposed a sealing flange 18. An appropriate termination 22 is sealed to the magic tee 12 as by a flange 24 which mates with the flange 18. In one particular, illustrative embodiment of this invention, a magic tee of a wave guide type and size WR90 was used.

The magic tee 12 has an additional flange 20 which mates with a flange 32 of the phase shifter 30 to effect an appropriate seal therebetween. Further, the phase shifter 30 includes a wave guide 36 of rectangular configuration which is divided by a partition 37 into first and second channels 38 and 40. The channels 38 and 40 are disposed with respect to the magic tee 12 to receive the two microwave signals propagated therefrom. Means for effecting a predetermined phase shift of the microwave signals are disposed respectively in each of the channels 38 and 40. More specifically, the phase shifting means illustratively includes a plurality of ferrite bits or segments 46 and 48 which are separated by a dielectric, non-magnetic spacer 42. Further, similar dielectric spacers 42 are disposed on either end of the ferrite bits 46 and 48 as shown in FIG. 1. The dielectric spacer 42 and the ferrite bits 46 and 48 are illustratively of a rectangular, annular configuration having approximately the same cross sectional dimensions and are aligned axially of each other. Though not shown in FIG. 1, a similar phase shifting means is disposed within the channel 38 and illustratively includes a pair of ferrite bits 47 and 49 (see FIGS. 7, 8, 9 and 10) which are separated by suitable dielectric spacers. Further, in order to latch or orientate the magnetization of the ferrite bits 46 and 48, a longitudinal conductor 50 is axially disposed through ferrite bits 46 and 48. Further, suitable terminal conductors 52 and 54 provide external connections for applying a current pulse through that portion of the longitudinal conductors 50 disposed through the ferrite bits 46 and 47. Further, terminal conductors 54 and 56 provide suitable connections for the application of a current pulse through that portion of the longitudinal conductors 50 disposed through the ferrite bits 48 and 49. For a more particular description of the operation and the construction of the phase shifter 30, reference is made to a copending application of William J. Parris, Ser. No. 396,121, entitled "Non-Reciprocal Microwave Apparatus" and assigned to the assignee of this invention. Briefly, each of the ferrite bits or segments 46 to 49 operate to effect a phase shift of 90° to the microwave signals that are introduced into the channels 38 and 40. As explained in the above-identified copending application, a pulse of current is applied between the terminal conductors 52 and 54 or between the terminal conductors 54 and 46 to thereby latch ferrite bits in a circumferential magnetic orientation. It is noted that a current pulse of an opposite polarity would introduce an opposite orientation into the ferrite bits and thus shift the phase of the microwave energy directed therethrough by 90°.

The phase shifter 30 is connected to the hybrid coupler 70 so that a flange 34 associated with the phase shifter 30 forms a seal with a flange 72 of the coupler 70. Further, the coupler includes a wave guide 76 which is divided by a central partition 78 into two channels 80 and 82 to receive respectively the microwave signals directed along the channels 38 and 40 of the phase shifter 30. The central partition 78 has a pair of slots 84 and 86 to allow the interchange of energy between the two microwave signals directed along the channels 80 and 82. More specifically, the coupler 70 has the property of transferring with a 90° phase shift half the power of the microwave signal directed into the input port of channel 80 to the output port of the channel 82. Further, the coupler 70 transfers in a like manner half of the energy of the microwave signal directed into the input port of the channel 82 to the output port of the channel 80 with a corresponding 90° shift. In one particular embodiment of this invention, the three DB, hybrid coupler 70 was of the type identified by the Model No. 90HT82 as manufactured by the Microwave Development Labs, Inc.

The microwave signals directed through channels 80 and 82 of the coupler 70 are applied to a tapered fin polarizer 90. More specifically, a flange 74 of the coupler 70 is secured to a flange 92 of the polarizer 90 to form a seal therebetween. The polarizer 90 includes a wave guide 96 which is shown to be of a square configuration and has a partition 98 dividing the wave guide 96 into a pair of channels 102 and 104. The centrally disposed partition 98 has a tapered or fin portion 100 which acts as will be explained to convert the linearly polarized microwave energy introduced into the channels 102 and 104 to a circularly polarized wave. Further, the polarizer 90 includes a flange 94 for connecting the phase conversion system 10 to suitable load such as an antenna for radiating the microwave signal onto a target and for receiving a return signal.

Figure 6:
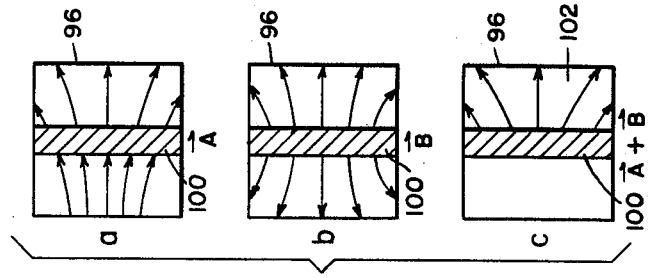

The conversion to circular polarization of the linearly polarized microwave signal directed through the system 10 is achieved by means of the tapered fin polarizer 90. Referring now to FIG. 2, there is shown on line M a left circular polarized microwave signal. On line N of FIG. 2, the left circular polarized microwave signal is resolved into two orthogonal $TE_{10}$ modes (i.e., components $\overline{A}$ and $\overline{B}$) with a 90° phase difference therebetween. As shown in FIGS. 3 to 6, the components A and B of the microwave signal introduced through the opening at flange 94 of the fin polarizer 90 is gradually divided into two portions. As shown in FIGS. 3a, 4a, 5a and 6a, the fin 100, when aligned with maximum electric vector of component B in the wave guide 96, will phase, delay the component B by 90° with respect to component A. As shown in FIGS. 3b, 4b, 5b and 6b, the fin 100 will divide the component A of the microwave signal into two half-height $TE_{10}$ modes of substantially equal power. With the maximum electric vector of component $\overline{A}$ perpendicular to the fin 100, the microwave signal will be divided into two half-height $TE_{10}$ modes of substantially equal power with the mode disposed in the channel 102 in phase with the mode in the channel 104. As shown in FIG. 6c, the components $\overline{A}$ and $\overline{B}$ destructively cancel in the channel 104 and combine to yield a half-height $TE_{10}$ mode in channel 102 of the wave guide 96. Thus, for a microwave signal of right circular polarization directed through the opening at the flange, the microwave signal reacts with the fin 100 to yield a half-height $TE_{10}$ mode in the channel 102 of the wave guide 96. Similarly, a right circularly polarized microwave directed into the wave guide 96 would result in a half-height $TE_{10}$ mode directed through the channel 104. Due to the reciprocal nature of the tapered fin polarizer 90, a linearly polarized wave directed through the flange 92 into the channel 104 will be converted into a right circularly polarized microwave and a linearly polarized wave directed into the channel 104 will yield a left circularly polarized microwave.

As shown in FIG. 7, linearly polarized microwave energy introduced into the magic tee 12 is converted to a left circularly polarized wave when it is emitted from the tapered fin polarizer 90. More specifically, the folded, hybrid magic tee 12 divides the input microwave energy into two waves which are introduced into the channels 38 and 40 of the phase shifter 30. The ferrite bits 47 and 49 disposed in the channel 38 have been energized with a current pulse so as not to effect the microwave signal directed from the tee 12 through the channel 38, whereas the ferrite bits 46 and 48 have been pulsed so that the ferrite bit 46 introduces a 90° phase shift and the ferrite bit 48 does not effect the microwave signal as it passes from the tee 12 through the channel 40. As a result, the microwave signal passing through the channel 40 is phase shifted 90° with respect to the microwave signal directed through the channel 38. The microwave signals are then introduced into the coupler 70 wherein one-half of the energy of the microwave signal directed through the channel 80 is introduced with a 90° phase shift into the channel 82 and half of the energy of the microwave signal directed through the channel 82 is transferred with a 90° phase shift to the wave directed through the channel 80. As shown in FIG. 7a, the microwave signals directed through the channel 82 of the coupler 70 combine constructively to provide a linearly polarized wave introduced into channel 104 of the polarizer 90, whereas the waves combine within channel 80 of the coupler 70 destructively to cancel each other out. Within the fin polarizer 90, the linearly polarized microwave signal introduced in the channel 104 is converted to a left circularly polarized microwave by the tapered fin 100.

The phase conversion system 10 as described above with respect to FIG. 1 is disposed within a radar system where it is desired to transmit one sense of circular polarization and to receive a return echo polarized in an opposite sense. It is well known that a circularly polarized signal that is transmitted onto a target by a radar system will be reflected from the target with a circular polarization of a sense opposite to that of the transmitted microwave signal. Thus, if a left circularly polarized microwave signal is transmitted, a right circularly polarized signal will be received from the antenna and would be directed into the system shown in FIG. 7b. Briefly, the right circularly polarized microwave introduced into the fin polarizer 90 will be converted into a linearly polarized microwave signal emerging from the channel 102. Approximately half of the microwave energy introduced into the channel 80 of the coupler 70 will be transferred into the channel 82 with a 90° phase shift. The ferrite bit 48 within the channel 40 of the phase shifter 30 will provide a 90° phase shift to the microwave signal directed therethrough, and the ferrite bits 47 and 49 disposed within the channel 38 will provide a phase shift of 180° to the microwave signal directed through the channel 38. As a result, two linearly polarized waves having a phase shift of 180° will be introduced into the magic tee 12.

Referring now to FIG. 8a, there is shown a mode of operation of the system 10 for converting a linearly polarized wave into a right circulatory polarized microwave signal. More specifically, the ferrite bits 46 and 48 have been pulsed or orientated to not effect the microwave signal transmitted from the tee 12, whereas one of the ferrite bits 47 and 49 has been orientated to provide a 90° phase shaft in the wave directed from the tee 12 through channel 38. As a result, the microwave signal directed through channel 38 has been shifted 90° with respect to the microwave signal directed through the channel 40. Next, the coupler 70 transfers with a 90° phase shift half of the microwave energy from the microwave signal directed through the channel 80 into the channel 82 to thereby achieve a cancellation of the waves in channel 82. Further, the coupler 70 transfers half of the microwave energy from the signal travelling through the channel 82 into the channel 80 to thereby achieve a reinforcement of the waves that are to be directed into the channel 102 of the tapered fin polarizer 90. In turn, the tapered fin polarizer 90 converts the linearly polarized microwave signal introduced into channel 102 into a right circularly polarized microwave signal that is to be transmitted.

As explained above, the polarization switching system 10 of this invention is a non-reciprocal system. Thus, as shown in FIG. 8b, a left circularly polarized microwave signal received from the target is introduced into the polarizer 90 and is converted into a linearly polarized wave that is directed into the channel 82 of the coupler 70. The coupler 70 transfers half of the microwave energy of the microwave signal directed through the channel 82 into the channel 80 with a phase shift of 90°. The phase shifter 30 performs a phase shift of approximately 180° on the microwave signal directed into the channel 40 and provides a further phase shift of 90° to the microwave signal introduced into the channel 38. As a result, the linearly polarized waves from channels 38 and 40, each with a phase shift of approximately 180°, are directed into the magic tee 12 which in turn recombines the two microwave signals at input port 14.

Figure 9A:
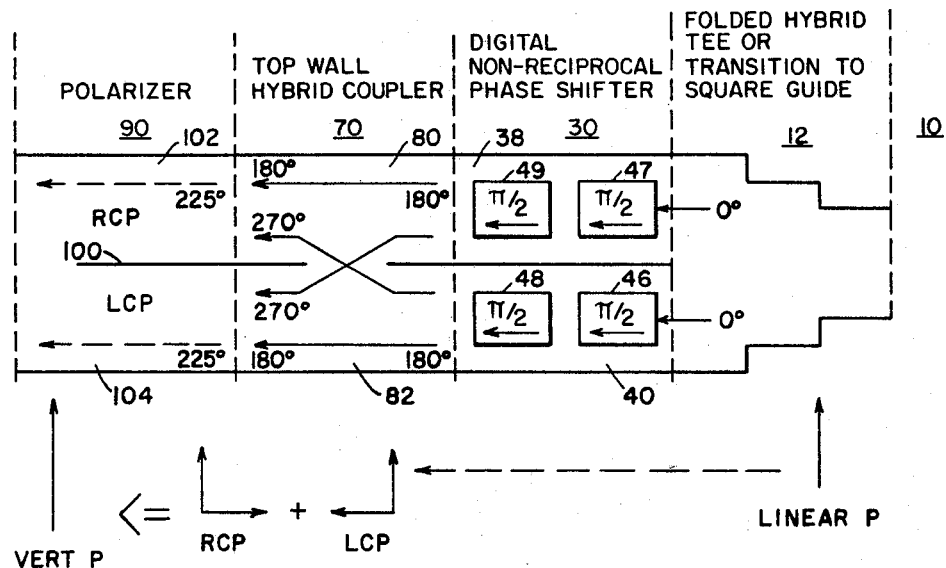
Figure 9B:
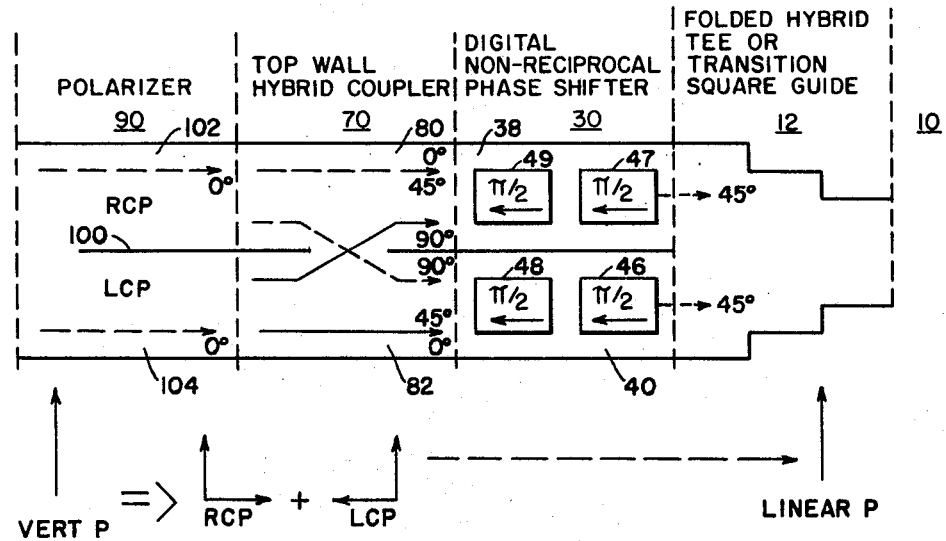

Referring now to FIGS. 9a and 9b, there is shown a mode of operation of the polarization switching system 10 which allows a linearly polarized wave introduced into the magic tee 12 to be transmitted from the polarizer 90 as a linear, vertically polarized wave and, similarly, a linear vertically polarized wave received at the tapered fin polarizer 90 to be transmitted through the system 10 and emitted from the magic tee 12 as a linearly polarized wave. More specifically, the ferrite bits 46 to 49 are orientated to each provide a 90° phase shift to the wave transmitted through the channels 38 and 40 to the left as shown in FIG. 9a, and not to affect the microwaves transmitted from the coupler 70 in the opposite direction as shown in FIG. 9b. Referring particularly to FIG. 9a, the wave directed through the channels 38 and 40 of the phase shifter are shifted 180° and are introduced respectively into the channels 80 and 82 of the coupler 70 where half of the energy of the microwave signal is transferred with a 90° phase shift to the microwave signal directed through the other channel. The linearly polarized microwave signal emerging from the channel 82 with a phase shift of 225° is converted by the polarizer 90 to right circular polarization. In a similar manner, the linearly polarized microwave signal emerging from the channel 80 with a phase shift of 225° is converted by the polarizer to left circular polarization. As a result, the horizontal components of the right and left circularly polarized waves cancel each other to provide a linearly polarized wave. A nonreciprocal process occurs as shown in FIG. 9b when a vertically polarized wave is introduced into the polarizer 90. The microwave signals emerging from the channels 102 and 104 of the polarizer 90 are linearly polarized with a zero phase shift. The coupler 70 transfers energy from one channel to the other to provide microwave signals of a linear polarization with a phase shift of 45° which are introduced into each of the channels 38 and 40. Since the ferrite bits 46 and 49 are magnetized so to not effect the microwave signals transmitted to the right as shown in FIG. 9b, the magic tee 12 receives linearly polarized waves emerging from the channels 38 to 40 with phase shifts of 45°.

Referring now to FIGS. 10a and 10b, there is shown a mode of operation of the operation of the polarization switching system 10 in which a linearly polarized microwave signal introduced into the tee 12 is converted to a horizontally polarized microwave signal and conversely, when a horizontally polarized microwave signal is introduced into the polarizer 90, a vertically polarized microwave signal emerges from the other end of the system 10. In the mode of operation, the ferrite bits 46 and 48 are orientated to effect a phase shift of 180° to a microwave signal directed to the left through the channel 40 and not to effect a phase shift of those microwave signals directed to the left as shown in FIGS. 10a and 10b. The ferrite bits 47 and 49 are so magnetized not to effect a microwave signal directed to the left through the channel 38 and to effect a phase shift of 180° to a microwave signal directed to the right as shown in FIGS. 10a and 10b. As shown in FIG. 10a, the microwave signal emerging from the channel 40 of the phase shifter 30 is advanced 180° with respect to the microwave signal emerging from the channel 38. The coupler 70 intercouples the microwave signals to provide a linearly polarized wave with a phase shift of 135° to be directed to the channel 104 of the polarizer 90 and a linearly polarized microwave signal with a phase shift of 315° to be directed to the channel 102 of the polarizer 90. The linearly polarized microwave signal emerging from the channel 82 is converted by the polarizer 90 to a left circularly polarized microwave while the microwave signal emerging from the channel 80 of the coupler 70 is converted to a right circularly polarized wave. The vertical components of the left and right circularly polarized microwave signals are cancelled thereby providing a horizontally polarized microwave. In the receive operation shown in FIG. 10b, a horizontal, linearly polarized microwave is directed into the polarizer 90 and linearly polarized microwave signals emerge from the channels 102 and 104 which are 180° out of phase. The coupler 70 intercouples the microwave signal to transmit into channel 40 of the phase shifter 30 a linearly polarized microwave signal with a phase shift of 315° and to introduce a linearly polarized microwave signal with a phase shift of 135° into the channel 98. As a result, linearly polarized microwave signals emerge from channels 38 and 40 with a phase shift of 315° thereby providing a linearly polarized microwave to be transmitted from the magic tee 12.

Thus, there has been shown a polarization conversion system incorporating a phase shifter 30 having four ferrite bits capable of effecting a phase shift of 90° which is capable of converting linearly polarized microwave signals to microwave signals of a left or right circular polarization and to microwaves of a horizontal or vertical linear polarization. The polarization conversion system as described above may be also used as an elliptical polarizer. This can be achieved by replacing the 90 phase ferrite bits with ferrite bits capable of achieveing smaller phase shifts. In this way, the amplitudes of the microwaves through each of the channels may be made unequal. In addition, duplexing action may be achieved by selectively switchiing the ferrite bits in each of the channels so that the energy is combined in the H arm 16 of the E plane folded hybrid tee 16.

An E band model of the above-described polarization conversion system has been developed. Right or left-hand circular polarization having ellipticity of 1 db or less can be obtained from an incident linearly polarized microwave signal. In addition, vertical or horizontal linear polarization can also be obtained from the incident linear poltarization. When transmitting in one mode of linear polarization the other unwanted mode polarization is attenuated 30 db or more. The above-described system would be capable of operating at power levels in the approximate range of 150 kilowatts and of achieving switching speeds in the microsecond or sub-microsecond range.

Referring now to FIGS. 11 and 12, there is shown an alternate embodiment of the switching system in accordance with the teachings of this invention. More specifically, a phase shifter 120 such as shown in FIG. 10 may be incorporated into a phase switching system which is capable of rotating the plane of polarization from $-90°$ to $+90°$ in $2^n$ incremental steps of $\alpha$ degrees per step where N equals the number of ferrite bits and $\alpha$ equals one-half the phase shift of which the smallest ferrite bit is capable. In particular, the phase shifter 120 includes a pair of flanges 122 and 124 between which is disposed a wave guide 130. A partition 131 separates the wave guide 130 into two channels 126 and 128. As shown in the broken-away view of FIG. 10, there is disposed within the channel 128 four ferrite bits or segments 134 to 137 which are separated by dielectric spacers 132. As shown in FIG. 11, a second plurality of ferrite bits or segments 154 to 157 are disposed within the channel 126 and are likewise separated by dielectric spacers 132. In one illustrative embodiment of this invention the ferrite bits 134 and 154; 135 and 155; 136 and 156; and 137 and 157 are capable of effecting phase shifts of 90°, 45°, 22.5° and 11.25°, respectively. Further, a longitudinal conductor 140 is disposed through the central opening in each of the ferrite bits and spacers. Further, appropriate terminal conductors are brought out through the wave guide 130 in order to apply individual current pulses to each of the ferrite bits. More specifically, terminal conductors 142 and 143 provide an electrical connection to that portion of the conductors 140 disposed through the ferrite bits 137 and 157. Terminal conductors 143 and 144 provide electrical access to that portion of the central conductors 140 disposed through the ferrite bits 136 and 156. Two pairs of terminal conductors 144 and 145 provide electrical access to that portion of the central conductors disposed through the ferrite bits 135 and 155, and the electrical conductors 145 and 146 provide connection to that portion of the central conductors 140 which pass through the ferrite bite 134 and 154.

As shown in FIG. 12, a magic tee 12, which is capable of separating the input power between two channels, is operatively connected to the phase shifter 120 to direct microwaves into the channels 126 and 128. Further, a tapered fin polarizer 90 is disposed to receive the microwave signals emerging from the channels 126 and 128 and to convert the incident linearly polarized waves into circularly polarized waves as explained above with respect to FIGS. 1 to 6. Further, it is noted that the phase shifter 120 may be modified to have a greater number of ferrite bits. There is shown in the above-identified copending application to Parris, a phase shifter having five ferrite bits capable of being switched to attain incremental steps of phase shift of 5.625° between $-180°$ and $+180°$.

In one illustrative mode of operation of the polarization switching system of FIG. 12, the ferrite bit 134 could be so magnetized to effect a phase shift of a microwave directed to the left as shown in FIG. 12, whereas remaining ferrite bits 135, 136, 137, 154, 155, 156 and 157 are polarized to effect phase shifts in microwaves directed to the right as shown in FIG. 12. As a result, the linearly polarized wave that is directed through the channel 128 will be shifted 90° with respect to the microwave directed through the channel 126. The microwave signals in each of the channels 128 and 126 are recombined by means of the tapered fin polarizer 90 into a round or a square wave guide. The nature of the fin 100 causes the linearly polarized microwave signals emerging from the channels 126 and 128 to be circularly polarized. However, the phase or sense of circular polarization of the microwave signals emerging from each of the channels 126 and 128 differ from each other by an angle of 90°. As indicated above, a linearly polarized wave introduced from the phase sifter 120 into channel 102 of the polarizer 90 will result in a left circularly polarized microwave signal emerging from the polarizer 90 and a linearly polarized wave introduced into the channel 104 will result in a right circularly polarized wave emerging therefrom. The right and left circularly polarized microwave signals have components which tend to cancel each other to produce a linearly polarized wave whose plane of polarization has been rotated by an amount equal to one-half the phase difference between the linearly polarized microwave signals introduced into the two channels 102 and 104. As a result, the linearly polarized wave emerging from the polarizer 90 in this specific mode of operation will be linearly polarized with a polarization angle of 45°. Since non-reciprocal varying elements are being used, the bits must be switched between transmit and receive operations. However, if reciprocal phase shifting bits are used, the shifting of the bits may be elimnated.

A system as shown in FIG. 12 has been made and experimentally verified at C-band frequencies. Further, such a system had a bandwidth of 10% to 15% and was capable of operating at a peak power of 150 kw. with a switching time in the order of less than 1 microsecond. Further, the insertion loss was less than .5 db and the VSWR was less than 1.2.

Since numerous changes may be made in the above-described apparatus and different embodiments of the invention may be made without departing from the spirit thereof, it is intended that all matter contained in the foregong description or shown in the accompanying drawings shall be interpreted as illustrative and not in a limiting sense.

What is claimed is:

1. A system for controlling the polarization of microwave energy comprising, magic tee means for dividing microwave energy into first and second linearly polarized microwave signals, a wave guide having first and second channels associated with said magic tee means to receive said first and second microwave signals respectively, third and fourth means disposed respectively within said first and second channels to shift the phase of said first and second microwave signals by predetermined amounts, and fifth means associated with said wave guide to receive said first and second microwave signals for converting said first and second linearly polarized microwave signals to circularly polarized microwave signals.

2. A system for controlling the polarization of microwave energy as claimed in claim 1, wherein each of said third and fourth means includes at least first and second ferrite bits for effecting incremental phase shifts in said microwave signals.

3. A system for controlling polarization of microwave energy as claimed in claim 2 wherein said third and fourth means exhibit non-reciprocal characteristics.

4. A system for controlling the polarization of microwave energy comprising, first means for dividing microwave energy into first and second linearly polarized microwave signals, a wave guide having first and second channels associated with said first means to receive said first and second microwave signals respectively, third and fourth means disposed respectively within said first and second channels to shift the phase of said first and second microwave signals by predetermined amounts, and fifth means associated with said wave guide to receive said first and second microwave signals for converting said first and second linearly polarized microwave signals to circularly polarized microwave signals, wherein said fifth means includes a wave guide, and a partition separating said last mentioned wave guide into third and fourth channels for receiving respectively said first and second microwave signals, said partition having a tapered portion.

5. A system for controlling the polarization of microwave energy comprising, first means for dividing microwave energy into first and second linearly polarized microwave signals, a wave guide having first and second channels associated with said first means to receive said first and second microwave signals respectively, third and fourth means disposed respectively within said first and second channels to shift the phase of said first and second microwave signals by predetermined amounts, fifth means associated with said wave guide to receive said first and second microwave signals for converting said first and second linearly polarized microwave signals to circularly polarized microwave signals, and sixth means disposed between said wave guide and said fifth means, said sixth means transferring with a phase shift a portion of the microwave energy associated with said first microwave signal to said second microwave signal and transferring a portion of the microwave energy associated with said second microwave signal with a phase shift to said first microwave signal.

6. A system for controlling the polarization of microwave energy as claimed in claim 5, wherein said sixth means takes the form of a wave guide having a partition dividing said wave guide into fifth and sixth channels, said partition having at least two slots therein for effecting the transfer of energy between said first and second microwave signals.

7. A system for controlling the polarization of microwave energy as claimed in claim 2, wherein said third and fourth means each includes N number of phase shifting bits for effecting phase shifts in incremental steps of a predetermined number of degrees.

8. A system for controlling the plane of polarization microwave energy as claimed in claim 7, wherein said phase shifting bits effect increasingly greater phase shifts.

References Cited

UNITED STATES PATENTS

| | | | |
|---|---|---|---|
| 2,866,972 | 12/1958 | Anderson | 333—21 XR |
| 3,277,401 | 10/1966 | Stern | 333—24.1 |
| 3,355,683 | 11/1967 | Brown et al. | 333—31 |

OTHER REFERENCES

Tech-Briefs No. 652: "Digital Phase Shifters," Microwave Journal, April 1965, page 43.

HERMAN KARL SALLBACH, Primary Examiner

MARVIN NUSSBAUM, Assistant Examiner

U.S. Cl. X.R.

333—24.1